United States Patent
Huang et al.

(10) Patent No.: US 7,203,235 B2
(45) Date of Patent: Apr. 10, 2007

(54) ARCHITECTURE AND METHOD FOR FINE GRANULARITY SCALABLE VIDEO CODING

(75) Inventors: Hsiang-Chun Huang, Junghe (TW); Chung-Neng Wang, Kaohsiung (TW); Ti-Hao Chiang, Taipei (TW); Hsueh-Ming Hang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 87 days.

(21) Appl. No.: 11/136,780

(22) Filed: May 25, 2005

(65) Prior Publication Data
US 2005/0220192 A1    Oct. 6, 2005

Related U.S. Application Data

(62) Division of application No. 10/229,580, filed on Aug. 27, 2002, now Pat. No. 7,072,394.

(51) Int. Cl.
*H04B 1/66* (2006.01)
(52) U.S. Cl. .............. 375/240.11; 375/240.25; 375/240.2; 375/240.12; 375/240.16; 375/240.23; 382/233; 382/235; 382/238; 382/250; 382/246

(58) Field of Classification Search ............ 375/240.11, 375/240.25, 240.12, 240.23, 240.03, 240.04, 375/240.06, 240.2, 240.16; 382/233, 235, 382/238, 246, 250, 251
See application file for complete search history.

(56) References Cited

U.S. PATENT DOCUMENTS 6,700,933 B1 *   3/2004   Wu et al. .............. 375/240.16

\* cited by examiner

*Primary Examiner*—Shawn S. An

(57) ABSTRACT

A robust fine granularity scalability video encoding includes a base layer encoder and an enhancement layer encoder in which motion compensated difference images are generated by comparing an original image to predicted images at base layer and enhancement layer with motion compensation. Based on leaky and partial predictions, a high quality reference image is constructed at the enhancement layer to improve temporal prediction. In the construction of the high quality reference image, one parameter $\beta$ controls the number of bitplanes of the enhancement layer difference coefficients used and another parameter $\alpha$ controls the amount of predictive leak. A spatial scalability module allows the processed pictures at the base layer and the enhancement layer to have identical or different spatial resolutions.

7 Claims, 9 Drawing Sheets

| Notation | Definitions |
|---|---|
| $F$ | The original image |
| $BLPI$ | Predicted base layer frame that is generated by motion compensation from the base layer frame buffer. |
| $MCFD_{BL}$ | Motion compensated frame difference of the base layer, which is the difference between BLPI and the original image. |
| $\hat{B}$ | Coded DCT coefficients of frame $MCFD_{BL}$. The $\hat{B}$ before de-quantization will be compressed as the base layer bitstream. |
| $B$ | The base layer reconstructed image, which is the summation of $BLPI$ and $\hat{B}$. $B$ will be stored in the base layer frame buffer. |
| $ELPI$ | Predicted frame of the enhancement layer that is generated by motion compensation from the enhancement layer frame buffer. |
| $MCFD_{EL}$ | Motion compensated frame difference of the enhancement layer which the difference between $ELPI$ and the original image. |
| $\hat{D}$ | Difference signal between $MCFD_{EL}$ and $\hat{B}$ for $P$-pictures or $MCFD_{BL}$ and $\hat{B}$ for $I$-pictures and $B$-pictures. $\hat{D}$ will be compressed as the enhancement layer bitstream. |
| $D$ | The final residual used at the enhancement layer prediction loop in the encoder. $(B+\alpha D)$ will be stored at the enhancement layer frame buffer of the encoder. |
| $\breve{D}$ | The received $\hat{D}$ in the decoder side. Since there may be truncation or error during the transmission of enhancement layer bitstream, $\hat{D}$ and $\breve{D}$ may be different. |
| $\Delta\hat{D}$ | The difference between $\hat{D}$ and $\breve{D}$. |
| $\tilde{D}$ | The reconstructed $D$ in the decoder side. $(B+\alpha\tilde{D})$ will be stored at the enhancement layer frame buffer of the decoder. |

FIG. 6

ARCHITECTURE AND METHOD FOR FINE GRANULARITY SCALABLE VIDEO CODING

CROSS-REFERENCES TO RELATED APPLICATIONS

This is a division of U.S. application Ser. No. 10/229,580, filed Aug. 22, 2002 now U.S. Pat. No. 7,072,994.

FIELD OF THE INVENTION

The present invention relates generally to an architecture and method of video coding and, in particular, to a framework for robust fine granularity scalability (RFGS) video coding of MPEG-4.

BACKGROUND OF THE INVENTION

Recently, the delivery of multimedia information to mobile device over wireless channels and/or Internet is a challenging problem because multimedia transportation suffers from bandwidth fluctuation, random errors, burst errors and packet losses. Thus, the MPEG-4 committee has adopted various techniques to address the issue of error-resilient delivery of video information for multimedia communications. However, it is even more challenging to simultaneously stream or multicast video over Internet or wireless channels to a wide variety of devices where it is impossible to optimize video quality for a particular device, bit-rate and channel conditions. The compressed video information is often lost due to congestion, channel errors and transport jitters. The temporal predictive nature of most compression technology causes the undesirable effect of error propagation.

To address the broadcast or Internet multicast applications, the MPEG-4 committee further develops the FGS profile that provides a scalable approach for streaming video applications. The MPEG-4 FGS representation starts by separating the video frames into two layers with identical spatial resolutions, which are referred to as the base layer and the enhancement layer. The bit-stream at base layer is coded by a non-scalable MPEG-4 advanced simple profile (ASP) while the enhancement layer is obtained by coding the difference between the original DCT (discrete cosine transformation) coefficients and the coarsely quantized coefficients for the base layer in a bit-plane by bit-plane fashion. The FGS enhancement layer can be truncated at any location, which provides fine granularity of reconstructed video quality proportional to the number of bits actually decoded. There is no temporal prediction for the FGS enhancement layer, which provides an inherent robustness for the decoder to recover from any errors. However, the lack of temporal dependency at the FGS enhancement layer decreases the coding efficiency as compared to that of the single layer non-scalable scheme defined by MPEG Video Group.

FIGS. 1a and 1b show the overall FGS encoder and the decoder structure used in MPEG-4. Detailed description of the technique used in FGS can be found in the paper "Overview of Fine Granularity Scalability in MPEG-4 Video Standard" published by W. Li in IEEE Transactions on Circuits and Systems For Video Technology, Vol. 11, No. 3, March 2002. The base layer uses non-scalable coding to reach low bound of the bit-rate range. The enhancement layer codes the difference between the original picture and the reconstructed picture using bit-plane coding of the DCT coefficients.

In FIG. 1a, the functional block labeled "Find Maximum" is to find the maximum number of bit-planes in a frame. The FGS decoder structure shown in FIG. 1a is the one standardized in the amendment of MPEG-4. The bit-stream of the enhancement layer may be truncated into any number of bits per picture after coding is completed. The decoder should be able to reconstruct an enhancement layer video from bit-steams of the base layer and the truncated enhancement layer. The quality of the enhancement layer video is proportional to the number of bits decoded by the decoder for each picture.

To improve the MPEG-4 FGS framework, a motion compensation based FGS (MC-FGS) technique with high quality reference frame was disclosed to remove the temporal redundancy for both the base and enhancement layers. The advantage of the conventional MC-FGS is that it can achieve high compression efficiency close to that of the non-scalable approach in an error-free transport environment. However, the MC-FGS technique suffers from the disadvantage of error propagation or drift when part of the enhancement layer is corrupted or lost.

Similarly, another conventional PFGS (progressive fine granularity scalable) technique improves the coding efficiency of FGS and provides means to alleviate the error drift problems simultaneously. To remove the temporal redundancy, this PFGS adopts a separate prediction loop that contains a high quality reference frame where a partial temporal dependency is used to encode the enhancement layer video. Thus, the PFGS technique trades coding efficiency for certain level of error robustness. In order to address the drift problem, the PFGS technique keeps a prediction path from the base layer to the highest bit-planes at the enhancement layer across several frames to make sure that the coding schemes can gracefully recover from errors over a few frames. The PFGS technique suffers from loss of coding efficiency whenever a lower quality reference frame is used. Such disadvantageous situation occurs when only a limited number of bit-planes are used or a reset of the reference frame is invoked.

SUMMARY OF THE INVENTION

This invention has been made to overcome the drawbacks of the conventional FGS framework used in MPEG-4 video coding. The primary object is to provide a flexible RFGS architecture that allows the encoder to make tradeoff between simultaneously improving the coding efficiency and maintaining adequate video quality for varying bandwidth or error prone environments.

According to the invention, the RFGS architecture comprises a base layer encoder, a spatial scalability module, an enhancement layer encoder, and a high quality base-layer predicator. The base layer is encoded with a non-scalable MPEG-4 ASP using a modification of B-pictures. The B-picture is encoded with a high quality reference frame at the enhancement layer. The enhancement layer is encoded with the MPEG-4 FGS syntax but with improved prediction schemes. The enhancement layer uses the same motion vectors from the base layer. The motion compensation module in the enhancement layer uses the base layer motion vectors and the high quality reference frames to generate the high quality predictions.

The spatial scalability module of this invention further comprises a motion estimation module and an up-sampling/down-sampling filter. For each coding path between the base layer encoder and the enhancement layer encoder, the motion estimation module is to generate an accurate motion vector of the enhancement layer encoder and the up-sampling/down-sampling filter is to adjust the spatial resolution between the two layers. With the aids of the spatial scalability module, the RFGS architecture can have the property that the processed pictures at the two layers may have identical or different spatial resolutions.

For constructing a better reference frame, the RFGS architecture of this invention is based on two motion compensated prediction techniques: leaky and partial predictions. Both techniques are used to provide fast error recovery when part of the bit stream is not available. Because this invention uses a high quality reference, it achieves improved coding efficiency.

According to the present invention, the adaptive selection of the bit-plane number can be used to allow the tradeoff between coding efficiency and error robustness. The coding efficiency is maximized for a range of the target channel bandwidth. The information from the enhancement layer is scaled by a leak factor $\alpha$, where $0 \leq \alpha \leq 1$ before adding to the base layer image to form the high quality reference frame. Such a leak factor is also used to alleviate the error drift. A near optimal exhaustive search for computing the optimized $\alpha$ is provided. It is also demonstrated that the tradeoff between coding efficiency and error attenuation can be controlled by the leak factor $\alpha$.

The experimental results show that the RFGS framework of the invention improves the coding efficiency up to 4 dB over the MPEG-4 FGS scheme in terms of average PSNR. The error recovery capability of the RFGS framework in this invention is verified by dropping the first few frames of a group of video object plans (GOV) at the enhancement layer. The RFGS framework covers several well-know techniques such as MPEG4 FGS, PFGS and MC-FGS as special cases.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 6 lists and defines all notations shown in FIGS. 4–5 for the RFGS coding framework of the invention.

DETAILED DESCRIPTION OF THE INVENTION

To prevent the error propagation due to packet loss in a variable bit-rate channel, a leaky prediction technique was used for the inter frame loop in DPCM and sub-band coding systems. Based on a fraction of the reference frame, the prediction is attenuated by a leak factor with a value between zero and unity. The leaky prediction strengthens the error resilience at the cost of coding efficiency since only part of the known information is used to remove the temporal redundancy. For a given picture activity and a bit error rate (BER), there exists an optimal leak factor to achieve balance between coding efficiency and error robustness.

Figure 1A:
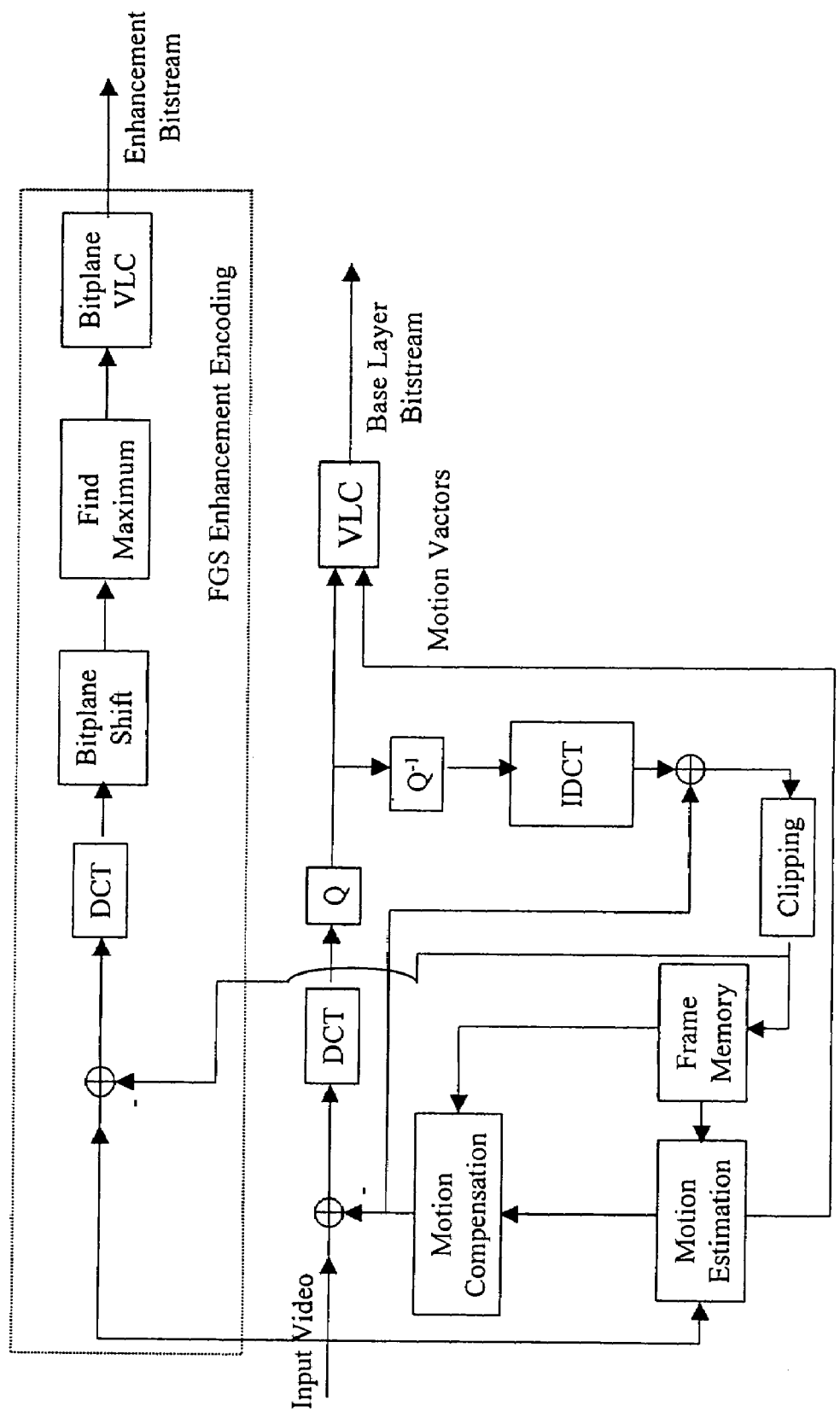
FIG. 1a shows an overall FGS encoder structure used in MPEG-4.
Figure 1B:
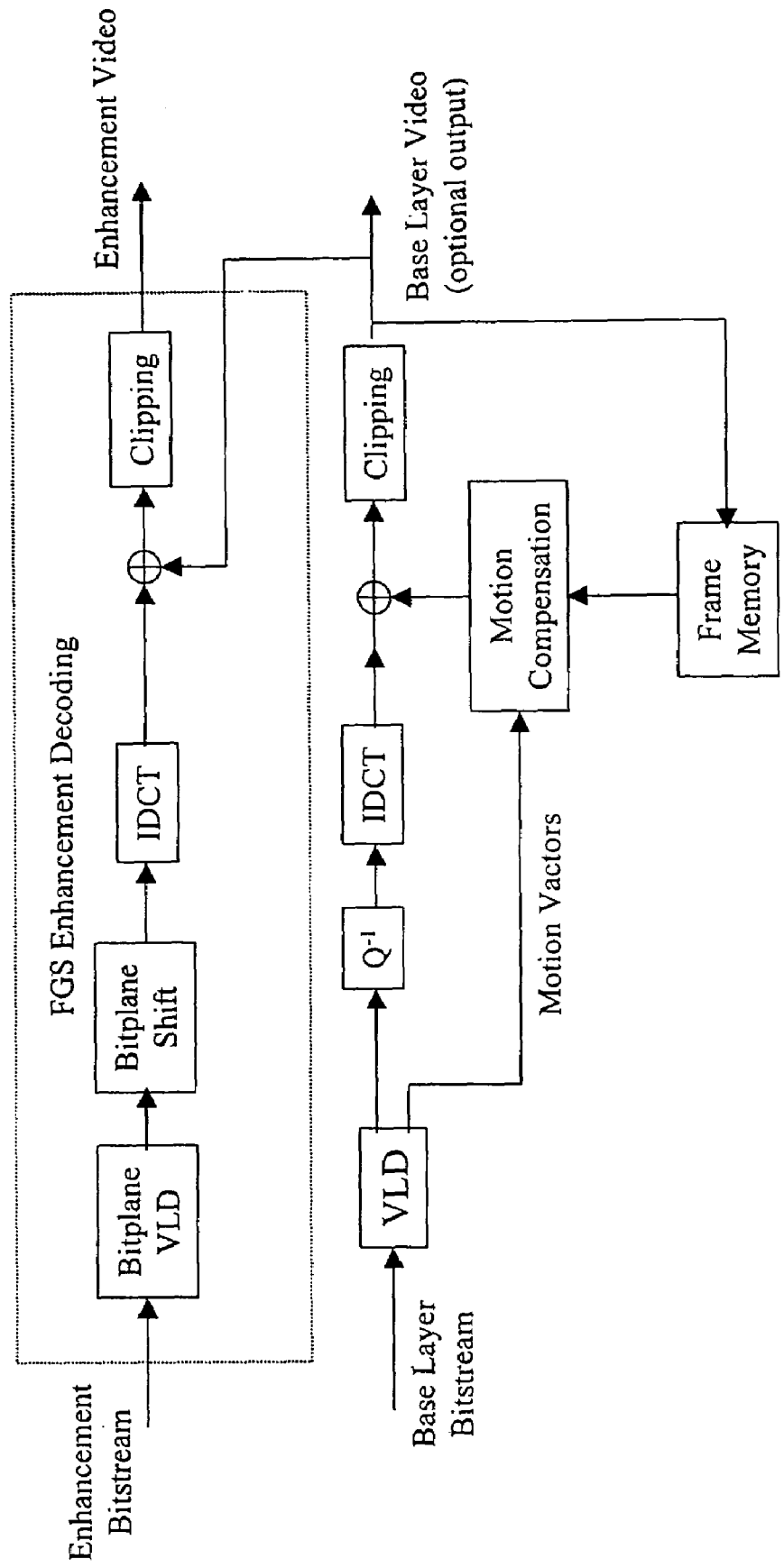
FIG. 1b shows an overall FGS decoder structure used in MPEG-4.
Figure 2:
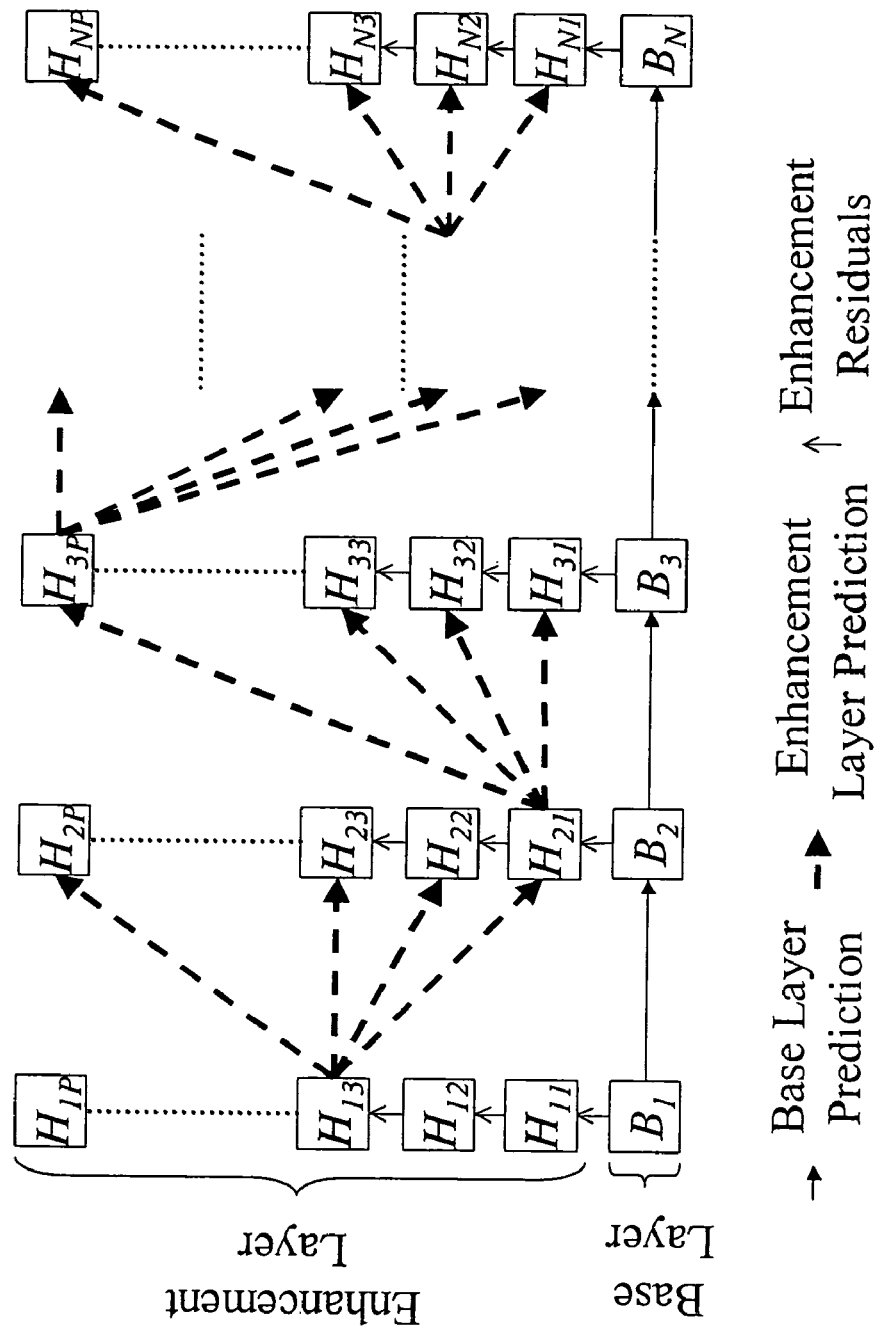
FIG. 2 illustrates the partial inter prediction mode for coding the bit-planes at the enhancement layer using the RFGS coding framework of the invention.

The RFGS architecture of this invention focuses on constructing a better reference frame based on two motion compensated prediction techniques, leaky and partial predictions. The leaky prediction technique scales the reference frame by a factor $\alpha$, where $0 \leq \alpha \leq 1$, as the prediction for the next frame. The leak factor is used to speed up the decay of error energy in the temporal directions. This invention uses the leak factor to scale a picture that is constructed based on the partial prediction. FIG. 2 illustrates the partial inter prediction mode for coding the bit-planes at the enhancement layer using the RFGS coding framework of the invention. Assume that each frame has P maximal number of bit-planes for the enhancement layer, and the reconstructed frame of the previous time i−1 is denoted as $B_{i-1}$ at the base layer.

Referring to FIG. 2, the RFGS framework of the invention is constructed with two prediction loops for the base and enhancement layers. The base layer loop is coded with a non-scalable approach for all frames $F_i$. The enhancement layer loop uses an improved quality reference frame that combines the reconstructed image at the base layer and part of the enhancement layer. Thus, the enhancement layer loop is built with an adaptive selection of number of bit-planes for the reference picture.

As shown in FIG. 2, each frame has the flexibility to select the number of bit-planes used to generate the high quality reference frame. For example, the first three bit-planes $H_{11}$, $H_{12}$ and $H_{13}$ of the first frame $F_1$ are used to compute the high quality reference frame of the second frame $F_2$. However, only the first bit-plane $H_{21}$ in the frame $F_2$ is used to predict the third frame $F_3$. The combination of selection for each frame constitutes multiple prediction paths. As the number of bit-planes $\beta$ used is increased, the residuals at the enhancement layer are decreased. On the other hand, the reconstruction errors will accumulate and propagate if the bit-planes used for the reference frame are not available at the decoder. Thus, the parameter $\beta$ can be used to control the tradeoff between coding efficiency and error robustness.

Combining the concept of partial and leaky predictions, the first $\beta$ bit-planes will be scaled by a leak factor. Accordingly, if any information at the first $\beta$ bit-planes is lost, the error is attenuated by $\alpha$ times for each frame at the enhancement layer. Since the value of $\alpha$ is smaller than unity, the drift will be eliminated in a few frames. Thus, the RFGS architecture of the invention is implemented by defining a set of the parameters for each frame:

$$\{M_t(\alpha, \beta)\}, t=0, \ldots (N-1). \qquad (1)$$

The symbol N is the total number of frames in the video sequence.

As compared to the PFGS framework, the periodic reset of the reference frames can be simulated with a periodic selection of the parameter $\alpha$ as zero. The MPEG-4 FGS framework is equivalent to the case of setting $\alpha$ to zero through the whole sequence. As compared to the MC-FGS framework, the use of high quality reference frames can be simulated with $\alpha$ equals to unity for all reference frames. Thus, the RFGS framework of the invention provides a flexible MC prediction scheme that can be adapted to achieve various tradeoff as proposed by PFGS and MC-FGS frameworks.

Figure 3:
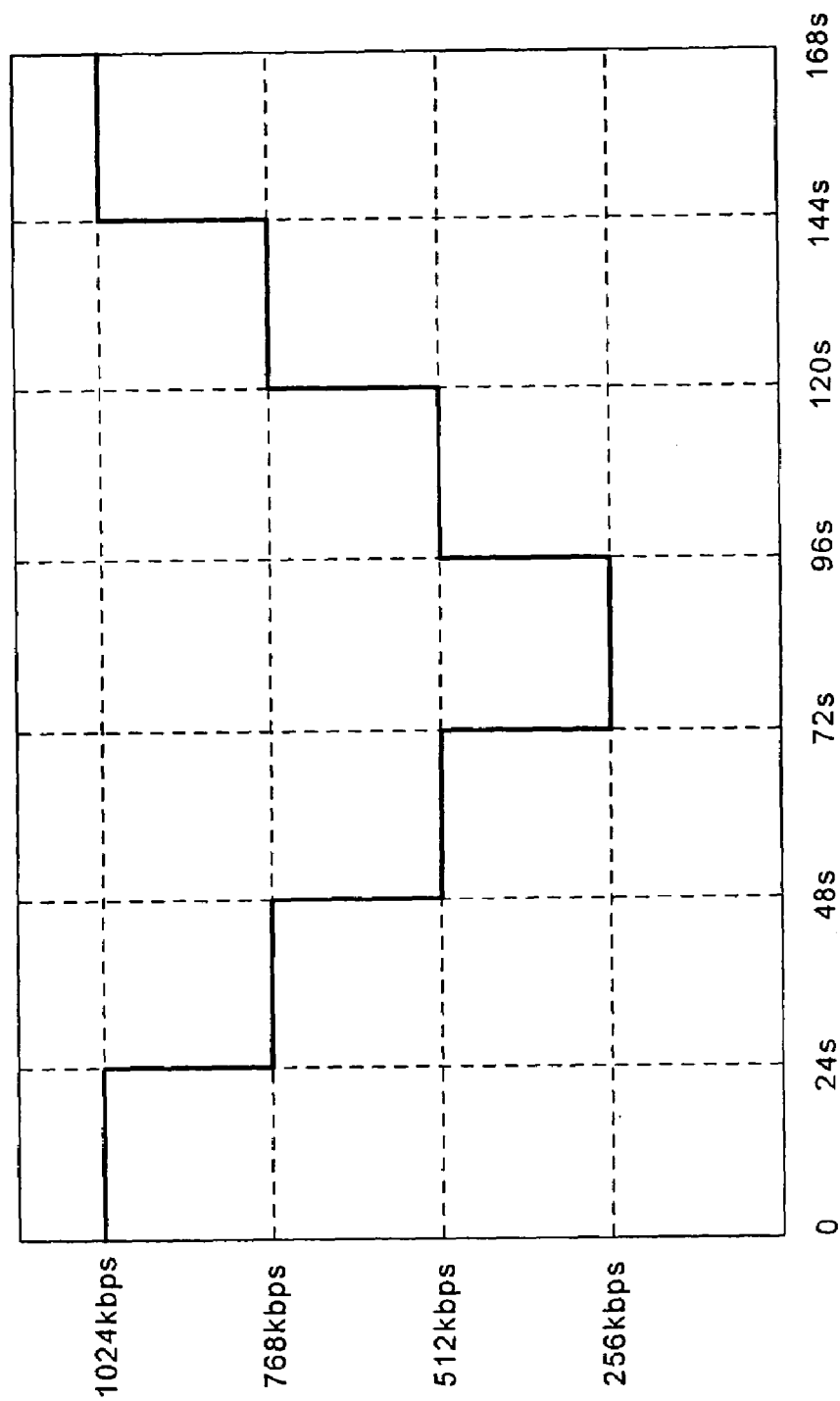
FIG. 3 illustrates a channel bandwidth variation pattern for the dynamic test defined in the MPEG document.

Based on the selected parameters $\alpha$ and $\beta$, the present invention constructs a trellis of predictions for each frame. The RFGS framework of the invention leaves great flexibility to optimize the selection of ($\alpha$, $\beta$) to achieve adequate performance in terms of coding efficiency and error robustness. The design is constrained by several parameters such as average bit-rate, average bit error rate and desired video quality. For instance, the sample traffic pattern shown in FIG. 3 has a significant variation in bandwidth and occasional packet loss. If a specific traffic pattern is known beforehand, the optimal set of $\beta$ should match the instantaneously available bandwidth and the drift is nonexistent. However, it is unrealistic to know this traffic pattern so this solution will not be optimal for other traffic patterns. Accordingly, the RFGS framework of the invention selects a set of parameters $\{M_t(\alpha, \beta)\}$, t=0, ... (N−1) to maximize the average coding efficiency over a range of channel bandwidth.

Figure 4A:
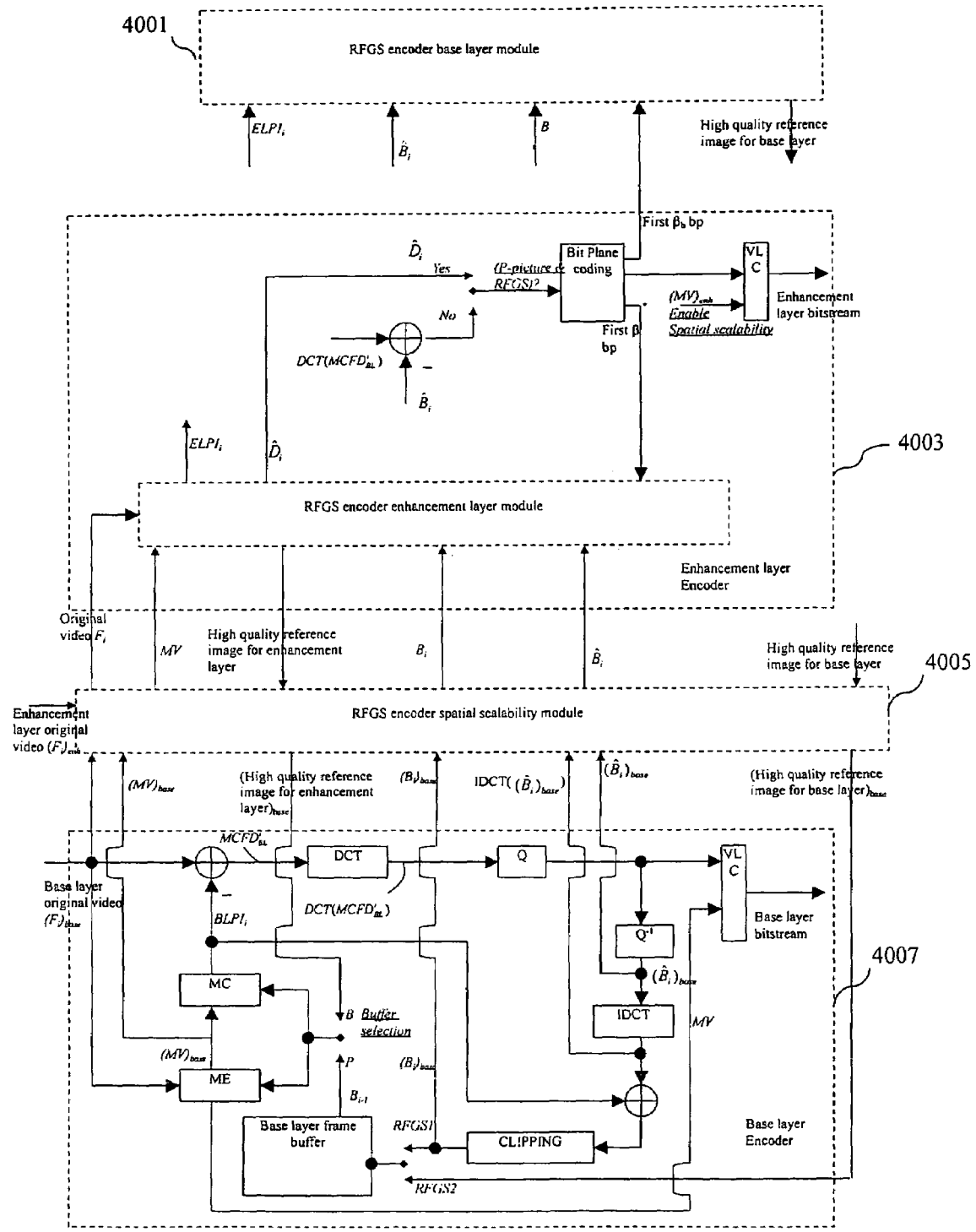
FIG. 4a is a block diagram of the RFGS encoder according to the present invention.
Figure 4B:
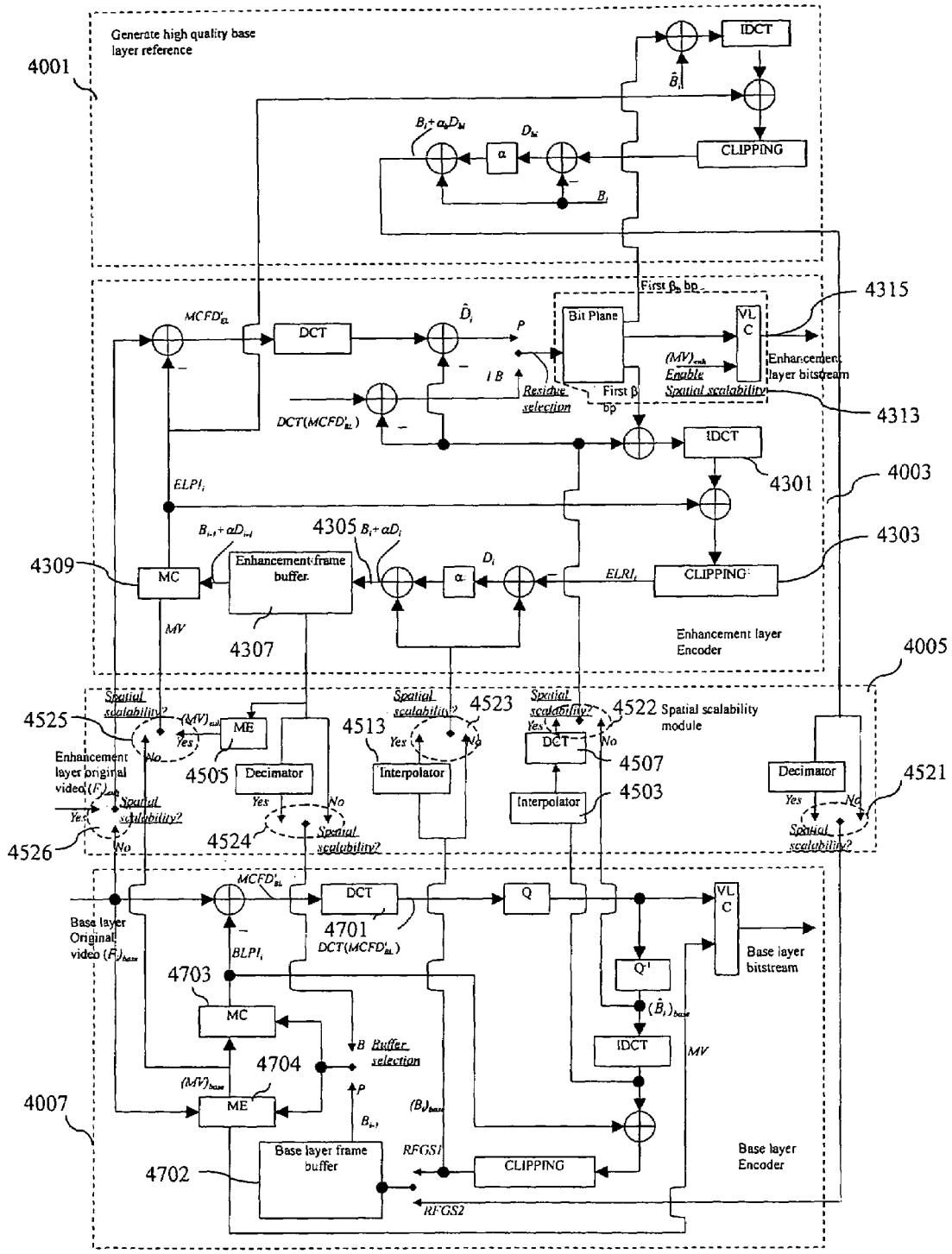
FIG. 4b illustrates each block of FIG. 4a in more detail.
Figure 5:
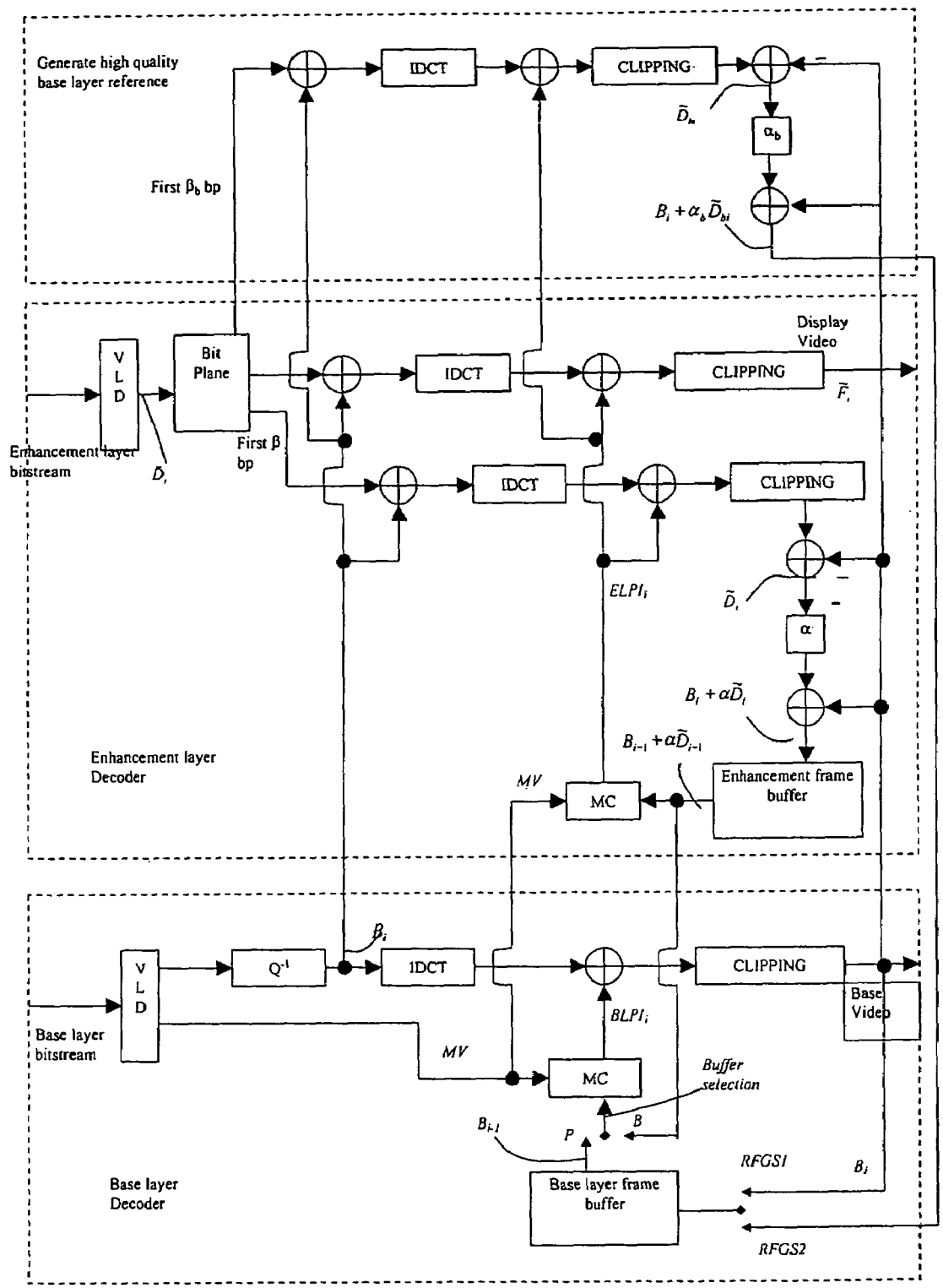
FIG. 5 is the block diagram of the RFGS decoder framework according to the invention.

Based on the leaky and partial predictions, the RFGS encoder and decoder according to the present invention are constructed and illustrated in FIGS. 4a–4b and FIG. 5. FIG. 4a is a block diagram of the RFGS encoder in accordance with the invention. FIG. 4b illustrates each block of FIG. 4a in more detail. FIG. 5 is the block diagram of the RFGS decoder framework according to the invention. As compared to the MPEG-4 FGS framework, the RFGS framework of the invention adds only a few modules including motion compensation, DCT/IDCT and a reference frame buffer to store the high quality reference frame that is constructed based on the base and enhancement layers. The leaky and partial predictions are applied to both the base and enhancement layers. The identical steps can be applied to the base layer except that the predicted frames of both layers are stored in two distinct frame buffers. All notations shown in FIGS. 4–5 for the RFGS coding framework of the invention are defined and listed in FIG. 6. FIGS. 4–5 will become better understood from the detailed description below with reference to the terminology defined in FIG. 6.

As shown in FIGS. 4a and 4b, in the base layer encoder, a base layer predicted image BLPI is generated by motion compensation from a base layer reference image. A motion compensated base layer difference image MCFD is computed from an original video image and the base layer predicted image BLPI. In the enhancement layer encoder, an enhancement layer predicted image ELPI is generated by motion compensation from an enhancement layer reference image. A motion compensated enhancement layer difference is computed from the original image and the enhancement layer predicted image ELPI. Based on leaky and partial predictions, a high quality reference image is constructed at the enhancement layer to improve temporal prediction. In the construction of the high quality reference image, one parameter $\beta$ controls the number of bitplanes of the enhancement layer difference coefficients used and another parameter $\alpha$ controls the amount of predictive leak.

Referring to FIG. 4a, the RFGS encoder comprises a high quality base layer prediction module 4001, an enhancement layer encoder 4003, a spatial scalability module 4005, and a base layer encoder 4007. The base layer is encoded in encoder 4007 with an ASP using a modification of the B-pictures. The B-picture, which is the base layer reconstructed image, is encoded with a high quality reference frame at the enhancement layer encoder 4003. The B-picture is not used for prediction. No drift will occur. The enhancement layer is encoded in encoder 4003 with an MPEG-4 FGS syntax but using the prediction schemes of the invention. The spatial scalability module 4005 allows the RFGS encoder of the invention to have the property that the processed pictures at the base layer and the enhancement layer may have identical or different spatial resolutions. The high quality base layer prediction module 4001 generates the reference image with high quality for the base layer.

Further referring to FIG. 4b, the enhancement layer encoder 4003 uses the same motion vectors from the base layer. The motion compensation module 4309 in the enhancement layer encoder 4003 uses the motion vectors from the base layer and the high quality reference frames saved in the enhancement layer frame buffer 4307 to generate the high quality predictions ELPI. The difference signal $MCFD_{EL}$ for the enhancement layer encoder 4003 is obtained by subtracting ELPI from the original signal F. For the predicted pictures, referred to P-pictures, the signal $\hat{D}$ is computed by subtracting $\hat{B}$ from the output of the discrete cosine transform 4311 of the enhancement layer difference signal $MCFD_{EL}$. As for the I-pictures and B-pictures, the signal $\hat{D}$ is computed by subtracting $\hat{B}$ from the output of the discrete cosine transform 4701 of the base layer difference signal $MCFD_{BL}$. Finally, the signal $\hat{D}$ is encoded with the MPEG-4 FGS syntax 4313 to generate the enhancement layer bit stream 4315.

The technique to generate the high quality reference image using the leaky and partial predictions is described with further reference to the enhancement layer encoder 4003. The first $\beta$ bit-planes of the difference signal $\hat{D}$ are combined with the reconstructed base layer DCT coefficients $\hat{B}$. The resultant signal is then transformed back to the spatial domain using IDCT 4301 and added to the enhancement layer motion compensated prediction ELPI. After performing clipping 4303, the difference between the high quality reference frame and the base layer reconstructed signal $(B_i)_{base}$ is computed and attenuated by a leak factor $\alpha$. The base layer reconstructed signal $(B_i)_{base}$ is added back before storing back into the enhancement layer frame buffer 4307.

The encoding of B-pictures shown in FIG. 4 uses the high quality reference frame as the extended base layer to form the prediction for the base layer and the enhancement layer. With further reference to the base layer encoder 4007, the output, the base layer difference signal $MCFD_{BL}$, from DCT 4701 is first quantized Q to form the B-picture base layer, and the residual (quantization error) is coded as FGS enhancement layer using MPEG-4 FGS syntax. Since B-picture is not used as reference frame, there is no drift. Thus, the present invention can increase the leak factor to achieve better coding efficiency. However, the inclusion of B-pictures at the enhancement layer requires an extra frame buffer to achieve the extra coding gain.

Since the difference between the high quality reconstructed signal $D_i$ and the low quality reconstructed signal $(B_i)_{base}$ is attenuated by a leak factor $\alpha$, the attenuated difference and the low quality reconstructed signals $(B_i)_{base}$ are summed together to form the high quality reference image saved in the enhancement layer frame buffer 4307 for the next frame. Therefore, the drift or the difference between the encoder and decoder are attenuated accordingly. If the leak factor $\alpha$ is set to zero, the drift is removed completely, which is exactly how the MPEG-4 FGS framework works.

The rationale for performing such a complicated and tricky attenuation process in the spatial domain is performed in this way, the errors can be recursively attenuated for all the past frames. If the attenuation process is only applied for the first few bit-planes of the current video object plane (VOP), only the errors occurred in the current VOP are attenuated. The errors that occurred earlier are only attenuated once and can still be propagated to the subsequent frames without further attenuation. According to the present invention, not only the errors occurred in the current VOP are attenuated but also all the errors in the earlier frames are attenuated. After several iterations, the errors will be reduced to zero. This will be illustrated in the analysis of error propagation later.

As mentioned before, the spatial scalability module 4005 allows the RFGS encoder of the invention to have the property that the processed pictures at both the base layer and the enhancement layer may have identical or different spatial resolutions. This spatial scalability is accomplished by the following coding scheme. An up-sampling/down-sampling filter is added to adjust the spatial resolution between both layers. The motion estimation module 4309 is also added in the enhancement layer encoder 4003 to generate the accurate motion vector of the enhancement layer. The hardware for the spatial scalability module 4005 is shown in FIG. 4b. As can be seen, it comprises six switches 4521~4526, two interpolators 4503 and 4513, two decimators 4501 and 4511, one motion estimator 4505, and one DCT 4507.

In the base layer encoder 4007, a base layer frame buffer 4702 is used to buffer either the base layer reconstructed image or the high quality base layer reference image predicted by the high quality base layer prediction module 4001. The base layer reference image used for the motion compensator 4703 and motion estimator 4704 can be selected from the image buffered in the enhancement layer frame buffer or the image buffered in the base layer frame buffer.

The RFGS framework of the present invention is constructed based on the leaky prediction to improve the error recovery capability as conventional video coding techniques such as the DPCM and the sub-band video coding. More particularly, it computes the high quality reference frame and the final residual for transmission. The followings illustrate in more detail the FGS framework shown in FIGS. 4–5 of the invention with the analysis of error propagation, the high quality reference in the base layer, and the bit rate control for the enhancement layer.

Analysis of Error Propagation

As shown in FIG. 4b, the high quality reference frame 4305 consists of the motion compensated base layer reconstructed frame, the quantized difference signal of the base layer and the attenuated final residual at the enhancement layer. Thus, the following relationship is true:

$$\text{High quality reference image} = B + \alpha \times D, \tag{1}$$

where B is the base layer reconstructed signal and D is the final residual used at the enhancement layer. Firstly, the reconstruction errors are computed when only partial bit stream is available. For the current frame, the original frame at time i is denoted as $F_i$. At the base layer, the reconstructed frame of the previous time i−1 is denoted as $B_{i-1}$. The base layer motion compensated frame difference signal is denoted as $MCFD_{BL}^i$ at time i. Thus, the original frame at time i with reference to FIG. 4b can be computed as $$F_i = (B_{i-1})_{mc} + MCFD_{BL}^i. \tag{2}$$

The subscript mc means that the $(B_{i-1})_{mc}$ is the motion compensated version of $B_{i-1}$. That is, the $(B_{i-1})_{mc}$ equals to the $BLPI_i$ as illustrated in FIG. 4b.

$$BLPI_i = (B_{i-1})_{mc}. \tag{3}$$

The coded version of the based layer difference signal $MCFD^{BLi}$ is denoted as frame $\hat{B}_i$. Let the quantization error after encoding be $Q_i$, the relationship between $MCFD_{BL}^i$, $\hat{B}_i$, and $Q_i$ is $$MCFD_{BL}^i = \hat{B}_i + Q_i. \tag{4}$$

The quantized version of the difference signal $MCFD_{BL}^i$, which equals to the signal $\hat{B}_i$ before de-quantization, is compressed as the base layer bit stream. In the MPEG-4 FGS coding scheme, the quantization error $Q_i$ is encoded to generate the enhancement layer bit stream.

For the enhancement layer, the base layer reconstructed frame $B_{i-1}$ of the previous time i−1 and $\alpha D_{i-1}$ is summed to create the high quality reference frame, where $D_{i-1}$ is the actually used information from the enhancement layer of the previous frame at time i−1. After motion compensation, the $MCFD_{EL}^i$ is computed from $$F_i = (B_{i-1} + \alpha D_{i-1})_{mc} + MCFD_{EL}^i, \tag{5}$$

where the $(B_{i-1} + \alpha D_{i-1})_{mc}$ is the same as the $ELPI_i$ in FIG. 4b. That is $$ELPI_i = (B_{i-1} + \alpha D_{i-1})_{mc}. \tag{6}$$

Assume that there is redundancy between $MCFD_{EL}^i$ and $\hat{B}_i$ (the coded version of $MCFD_{BL}^i$), the frame $\hat{B}_i$ is subtracted from the difference signal $MCFD_{EL}^i$ to remove such redundancy. The resultant difference is denoted as $\hat{D}_i$, which is compressed for transmission at the enhancement layer. Thus, $$\hat{D}_i = MCFD_{EL}^i - \hat{B}_i. \tag{7}$$

By substituting (7) into (5), the original image $F_i$ can be reformulated as $$F_i = (B_{i-1} + \alpha D_{i-1})_{mc} + \hat{B}_i + \hat{D}_i. \tag{8}$$

By grouping the respective information at the base layer and the enhancement layer, (7) becomes $$F_i = (B_{i-1})_{mc} + \hat{B}_i + (\alpha D_{i-1})_{mc} + \hat{D}_i \tag{9}$$

$$= B_i + D_i, \tag{10}$$

where $$B_i = (B_{i-1})_{mc} + \hat{B}_i, \tag{11}$$

and $$D_i = (\alpha D_{i-1})_{mc} + \hat{D}_i. \tag{12}$$

The signals $B_i$ and $D_i$ are used for the prediction of next frame. It should be noted that for simplicity, it has made the assumption that all of the bit planes in $\hat{D}_i$ are used in the prediction loop at the enhancement layer. By expanding the recursive formula of $D_i$ in (12), (12) becomes $$D_i = \left(\alpha\left((\alpha D_{i-2})_{mc} + \hat{D}_{i-1}\right)\right)_{mc} + \hat{D}_i \tag{13}$$

$$= \left(\alpha\left(\left(\alpha\left((\alpha D_{i-3})_{mc} + \hat{D}_{i-2}\right)\right)_{mc} + \hat{D}_{i-1}\right)\right)_{mc} + \hat{D}_i$$

$$= \ldots .$$

As demonstrated in (13), it is obvious that the any error in the final residual $D_i$ is attenuated in the RFGS framework of the present invention. Assume there is a network truncation or error at the enhancement layer for frame $F_{i-2}$, and the received enhancement layer bit stream is denoted as $\hat{D}_{i-2}$ and the transmission error is denoted as $\Delta \hat{D}_{i-2}$. Then, $$\hat{D}_{i-2} = \check{D}_{i-2} + \Delta \hat{D}_{i-2}. \tag{14}$$

The reconstructed version of $D_{i-2}$ is denoted as $\tilde{D}_{i-2}$. Thus, $$\tilde{D}_{i-2} = (\alpha D_{i-3})_{mc} + \check{D}_{i-2} \tag{15}$$
$$= (\alpha D_{i-3})_{mc} + \hat{D}_{i-2} - \Delta \hat{D}_{i-2}.$$

Comparing (12) and (15), the difference between $D_{i-2}$ and $\tilde{D}_{i-2}$ is $\Delta \hat{D}_{i-2}$.

Now tracing back to the frame $F_{i-1}$ further derivation, for simplicity, it has made the assumption that there is no error or bit truncation at the enhancement layer for frames $F_{i-1}$ and $F_i$. By expanding (15), it becomes $$\tilde{D}_{i-1} = (\alpha \tilde{D}_{i-2})_{mc} + \hat{D}_{i-1} \tag{16}$$
$$= (\alpha((\alpha D_{i-3})_{mc} + \hat{D}_{i-2} - \Delta \hat{D}_{i-2}))_{mc} + \hat{D}_{i-1}.$$

The difference between $D_{i-1}$ and $\tilde{D}_{i-1}$ is now $\alpha(\Delta \hat{D}_{i-2})$. Moving on to the frame $F_i$, it gets $$\tilde{D}_i = (\alpha \tilde{D}_{i-1})_{mc} + \hat{D}_i \tag{17}$$
$$= (\alpha((\alpha((\alpha D_{i-3})_{mc} + \hat{D}_{i-2} - \Delta \hat{D}_{i-2}))_{mc} + \hat{D}_{i-1}))_{mc} + \hat{D}_i.$$

The difference between $D_i$ and $\tilde{D}_i$ is now $\alpha^2(\Delta \hat{D}_{i-2})$. From the above derivations, it is obvious that the errors occurred in the decoded bit stream at the enhancement layer are attenuated by a factor of $\alpha$ for each iteration. After several iterations, the error will be attenuated to zero for $\alpha$ less than unity. Thus, the drift is removed from the system.

Figure 7:
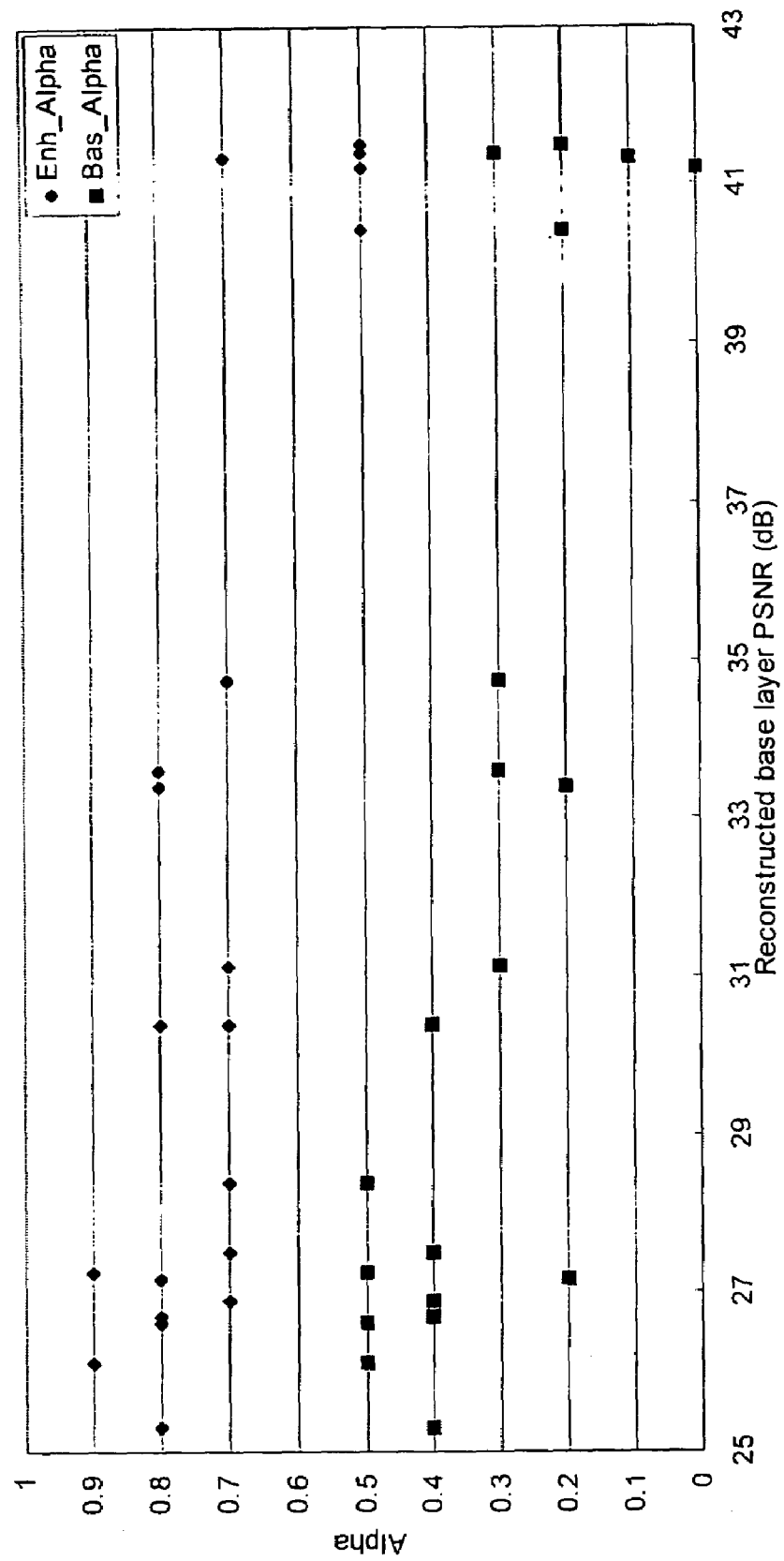
FIG. 7 shows the linear dependency between the near-optimal combinations of $\alpha_e$ and $\alpha_b$ and the picture quality in PSNR values of base layer.

As an example shown in FIG. 7, there is a video bit stream for N frames. Assume that only the i-th frame $F_i$ is lost during transmission, then the mean square error (MSE) for the reconstructed enhancement layer frame of size H×M can be computed as $$e_i^2 = \frac{1}{HM} \sum_{x=1}^{H} \sum_{y=1}^{M} \left( \hat{F}_i(x,y) - \hat{F}_i^e(x,y) \right)^2, \tag{18}$$

where the signal $\hat{F}_i(x,y)$ represents the reconstructed frame with all bit planes, and the $\hat{F}_i^e(x,y)$ represents the reconstructed frame where some bit planes are lost. Consequently, the average video quality degradation of the reconstructed picture that is caused by the errors at frame $F_i$ is $$\Delta MSE_{avg} = \frac{(1 + \alpha^2 + \ldots + \alpha^{2(N-i)})}{N} e_i^2 = \frac{1 - (\alpha^2)^{N-i+1}}{(1 - \alpha^2)N} e_i^2. \tag{19}$$

As $\alpha$ tends to unity, the average MSE accumulated through the prediction loop accumulates as expected.

For the leak factor less than unity, the degradation is decreased exponentially.

The error attenuation can be approximated with an exponential function $$\Delta PSNR(\alpha) = K_1(\alpha) e^{-K_2(\alpha) \cdot t} = K_1(\alpha) e^{-\frac{t}{\tau(\alpha)}}, \tag{20}$$

where $K_1(\alpha)$ and $K_2(\alpha)$ are constants that vary as a function of $\alpha$ and can be computed using the least square approximation technique. The constant $K_2(\alpha)$ is a reciprocal of the time constant $\tau(\alpha)$ for an exponential function. It is expected that $K_2(\alpha)$ is increased as $\alpha$ is decreased because the errors are attenuated faster when $\alpha$ is decreased. Thus, the selection of the leak factor $\alpha$ is a critical issue to achieve a better balance between coding efficiency and error robustness. For such $\alpha$ that is close to unity, the coding efficiency is the best while the error robustness is the worst with longest attenuation time constant. On the other hand, for such $\alpha$ that is close to zero, the error recovery property will be enhanced at the cost of less coding efficiency.

High Quality Reference in the Base Layer

As mentioned before, the signal $\hat{D}$, which is transmitted at the enhancement layer, is computed by subtracting $\hat{B}$ from the enhancement layer difference signal $MCFD_{EL}$. Such a differencing reduces the energy of the residuals but increases the dynamic range of the signal $\hat{D}$, which is particularly inefficient for bit-plane coding. Thus, there is room for further improvement. Additionally, there is redundancy that exists between the high quality reference image for the enhancement layer and the base layer difference signal $MCFD_{BL}$. To decrease the fluctuation of $\hat{D}$ and remove the redundancy, a higher quality reference image for the base layer is used. As compare to the signal B, the statistic characteristics of the higher quality reference for the base layer is closer to that of the high quality reference image for the enhancement layer. Therefore the dynamic range of $\hat{D}$ is reduced and the temporal redundancy between the high quality reference image for the enhancement layer and the signal $MCFD_{BL}$ is also reduced.

FIGS. 4–5 illustrate how the high quality reference is generated for the base layer. Part of the enhancement layer is duplicated in the part "generate high quality base layer reference" to form the high quality reference image for the base layer. The derivation of the high quality reference image for the base layer is identical to that for the enhancement layer except that the base layer has its own FGS parameters, which are denoted as $\alpha_b$ and $\beta_b$, respectively. The resultant high quality reference image replaces the signal B and is stored in the base layer frame buffer.

Although the use of a high quality reference image for the base layer can achieve a better coding efficiency, it suffers from drift problem at low bit rate. The drift at the base layer cannot be removed because the base layer reference image is not attenuated by $\alpha$. To strike a balance between the coding efficiency and the error drift, a small $\alpha$ should be used for the base layer. With a suitable selection of $\alpha_b$, the drift at low bit rate can be reduced and the coding efficiency is significantly enhanced for medium and high bit rates.

Bit Rate Control for the Enhancement Layer

For the conventional MPEG-4 FGS video coding, the rate control is not an issue since there is no temporal dependency among frames at the enhancement layer. However, the rate control is relevant in the RFGS of the present invention, especially when the expected range of bandwidth in operation is widely varied. The server can adaptively determine the number of bits to be sent frame by frame. When the expected channel bandwidth is small, the bit planes used to construct the high quality reference frame may not be available mostly. Since only the I-picture and P-pictures are used as the reference frames, the limited bandwidth should be allocated to those anchor frames at low bit rate. The B-pictures are also improved because better anchor frames are used for interpolation. When the average bit rate becomes higher, additional bits should be allocated to B-pictures, where the bits can be spent on the most significant bit planes for more improvements. By allocating more bits to the P-pictures, the overall coding efficiency is improved but the PSNR values vary significantly between the adjacent P-picture and B-picture, especially at medium bit rate, where most bit planes in P-pictures have been transmitted but only a few bit planes for B-pictures are transmitted. The maximal PSNR difference may be up to 4 dB in the simulation of the invention.

To achieve better visual quality, the rate control scheme of the invention reduces the variance of the PSNR values of the adjacent pictures at the cost of decreasing the overall quality by about 0.5 dB in PSNR. Since the scheme provides an embedded and fully scalable bit stream, the rate control can occur at server, router, and decoder. In the invention, the rate control at the server side is performed for all simulations.

As mentioned before, the enhancement layer information is scaled by a leak factor $\alpha$, where $0 \leq \alpha \leq 1$ before adding to the base layer image to form the high quality reference frame. Such a leak factor is also used to alleviate the error drift. This invention performs a near optimal exhaustive search to computes the optimized $\alpha$ by dividing every sequence into several segments that contain a GOV. The method for selecting the leak factor includes three steps as described in the followings.

Firstly, the "near optimal" scenario is defined based on a criterion of the average weighted difference (AWD), which is the weighted sum of the PSNR differences between the RFGS and the single layer approaches for a given bit rate range. Thus, $$AWD = \sum_{BR} W(BR) \times D(BR), \quad (21)$$

where BR is a set of evenly spaced bit rate for a given bit rate range, W(BR) is the weighting function for the bit rate set BR, and D(BR) is a set of the PSNR differences between the RFGS and single layer approaches for every bit rate from the set BR. In the simulation of this invention, each GOV has 60 frames, the set BR is defined by BR={256, 512, 768, 1024, 1280, 1536, 1792, 2048, 2304} kbps, and the weighting function is W(•)={2, 2, 2, 2, 1, 1, 1, 1, 1}, where the importance of the PSNR differences at low bit rate is stressed.

Secondly, the parameters $\alpha_e$ for the enhancement layer and $\alpha_b$ for the base layer are scanned from 0.0 to 0.9 with a step size of 0.1. All the combinations of $\alpha_e$ and $\alpha_b$ are employed for each GOV within the sequence, and the pair of $\alpha_e$ and $\alpha_b$ with minimal AWD is selected. This thus can get a near-optimal combination of $\alpha_e$ and $\alpha_b$ for each GOV. The results would be optimal if $\alpha_e$ and $\alpha_b$ are adapted at frame level but the complexity is prohibitive.

Thirdly, a linear model is first provided for computing the near optimal $\alpha$ based on the PSNR value of the base layer. For each frame, this invention first gets the PSNR values for the base layer after encoding. Based on the derived PSNR value per frame and the linear model, the invention then computes both $\alpha_e$ and $\alpha_b$ and encodes every frame at the enhancement layer. FIG. 7 shows the linear dependency between the near-optimal combinations of $\alpha_e$ and $\alpha_b$ and the picture quality in PSNR values of base layer. The frames within five GOVs are used for the simulations with four sequences, Akiyo, Carphone, Foreman, and Coastguard. Each GOV has 60 frames. As the PSNR value of the base layer reconstructed frame is decreased, the near optimal $\alpha$ tends to be increased accordingly. Their relationship is almost linear if several outliers are eliminated.

Further experimental results demonstrate that the RFGS framework using the linear model has almost identical PSNR values as the RFGS based on the near optimal exhaustive search, which has at maximum 0.2 dB difference. The performance of the RFGS based on the linear model is much superior to the RFGS with fixed $\alpha_e$ and $\alpha_b$ that are empirically found.

Similarly, this invention encodes video sequences using different combinations of the numbers of bit planes for the enhancement layer and the base layer (denoted as $\beta_e$ and $\beta_b$, respectively), where $\alpha_e$ and $\alpha_b$ are computed with the linear model of the invention. Empirically, the performance is better when 2 to 4 bit planes are used for coding. By applying all possible combinations of $\beta_e$ and $\beta_b$ within a specified range to the whole sequence, it has been found the coding efficiency with identical $\beta$ for both layers is better than that with distinct $\beta$ for each layer. The optimal $\beta$ can be selected based on the range of the target bandwidth. Accordingly, this invention discloses a simple bit stream switch method in the video streaming server for further improvement of the average video quality with the cost of a large storage device.

The bit stream switch method according to the invention firstly encodes the bit stream with several different $\beta$ and stores them in the streaming server. Then, the best of the bit streams stored is chosen to maximize the video quality at the current bandwidth. Finally, the server simply selects the selected bit stream at the switch point, adheres to the previous bit stream, and sends it out. The switching can be processed with what type of the picture of the picture, intra coded or not. It provides the maximal flexibility for the use of the switch points in terms of random access. At the decoder side, the received bound bit stream may have drift error at the switch point, since the bit stream after the switch point is expected to have a reference frame that has the same $\beta$ as itself. Under the intrinsic error recovery capability of the RFGS of the invention, this error will be fast recovered and the video can be improved. The RFGS of the invention needs to store only a few bit streams in the server and can cover a very large range of bandwidth. A fine bandwidth and visual quality adaptation can also be achieved under the FGS framework of the invention.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for robust fine granularity scalability video decoding, comprising:
a base layer decoder receiving a base layer bit stream and a base layer reference image for generating a base layer video image; and
an enhancement layer decoder receiving an enhancement layer bit stream, a motion estimation vector, and coded base layer discrete cosine transform coefficients for generating a display video image;
wherein said base layer reference image is generated from said enhancement layer decoder or said base layer decoder, and said coded base layer discrete cosine transform coefficients are generated from said base layer decoder; and
wherein said enhancement layer decoder further comprises:
a variable length decoder receiving said enhancement layer bit stream and generating enhancement layer difference coefficients;
a bitplane decoder decoding said enhancement layer difference coefficients;
a first summation unit adding decoded enhancement layer difference coefficients from said bitplane decoder to said base layer difference coefficients and generating enhancement layer discrete cosine transform coefficients;
a first inverse discrete cosine transform unit receiving said enhancement layer discrete cosine transform coefficients and generating an enhancement layer difference image;
a second summation unit adding said enhancement layer difference image to an enhancement layer predicted image and generating an unclipped display video image;
a first clipping unit clipping said unclipped display video image and generating a display video image;
a third summation unit adding first $\beta$ bitplanes of said decoded enhancement layer difference coefficients from said bitplane decoder to said base layer difference coefficients and generating enhancement layer partial discrete cosine transform coefficients;
a second inverse discrete cosine transform unit receiving said enhancement layer partial discrete cosine transform coefficients and generating an enhancement layer partial difference image;
a fourth summation unit adding said enhancement layer partial difference image to said enhancement layer predicted image and generating an unclipped partial display video image;
a second clipping unit clipping said unclipped partial display video image and generating a partial display video image;
a first subtraction unit subtracting said base layer video image from said partial display video image and generating an enhancement layer reconstructed difference image;
a first scaler scaling said enhancement layer reconstructed difference image by a factor $\alpha$ and generating a scaled enhancement layer reconstructed difference image;
a fifth summation unit adding said scaled enhancement layer reconstructed difference image to said base layer video image and generating an enhancement layer reconstructed image;
an enhancement layer frame buffer for buffering said enhancement layer reconstructed image; and
a motion compensator receiving said motion vector and an enhancement layer reconstructed image buffered in said enhancement layer frame buffer and generating said enhancement layer predicted image.

2. The apparatus for robust fine granularity scalability video decoding as claimed in claim 1, wherein said base layer reference image is selected from an image buffered in said base layer frame buffer or said enhancement layer frame buffer.

3. The apparatus for robust fine granularity scalability video decoding as claimed in claim 1, wherein $\beta$ is an integer number between 0 and a maximum number of bit planes of said enhancement layer difference coefficients.

4. The apparatus for robust fine granularity scalability video decoding as claimed in claim 1, wherein $\alpha$ is greater than or equal to 0 and smaller than or equal to 1.

5. The apparatus for robust fine granularity scalability video decoding as claimed in claim 1, further including a high quality base layer prediction module comprising:
a sixth summation unit adding said base layer difference coefficients to first $\gamma$ bitplanes of said enhancement layer difference coefficients for generating predicted high quality enhancement layer partial difference coefficients;
a third inverse discrete cosine transform unit transforming said predicted high quality enhancement layer partial difference coefficients into a predicted high quality enhancement layer partial difference image;
a seventh summation unit adding said predicted high quality enhancement layer partial difference image to said enhancement layer predicted image and generating an unclipped high quality enhancement layer partially reconstructed image;
a third clipping unit receiving said unclipped high quality enhancement layer partially reconstructed image and generating a high quality enhancement layer partially reconstructed image;
a second subtraction unit subtracting said base layer video image from said high quality enhancement layer partially reconstructed image and generating a high quality enhancement layer reconstructed difference image;
a second scaler scaling said high quality enhancement layer reconstructed difference image by a factor $\zeta$ and generating a scaled high quality enhancement layer reconstructed difference image; and
an eighth summation unit adding said scaled high quality enhancement layer reconstructed difference image to said base layer video image and generating a high quality base layer reference image;
wherein said base layer frame buffer further has a selection switch for selecting either said base layer video image or said high quality base layer reference image.

6. The apparatus for robust fine granularity scalability video decoding as claimed in claim 5, wherein $\gamma$ is an integer number between 0 and said maximum number of bit planes of said enhancement layer difference coefficients.

7. The apparatus for robust fine granularity scalability video decoding as claimed in claim 5, wherein $\zeta$ is greater than or equal to 0 and smaller than or equal to 1.

* * * * *